(12) United States Patent
Li et al.

(10) Patent No.: US 9,715,720 B1
(45) Date of Patent: Jul. 25, 2017

(54) SYSTEM AND METHOD FOR REDUCING IMAGE NOISE

(71) Applicant: Marvell International Ltd., Hamilton (BM)

(72) Inventors: Hongxin Li, Shanghai (CN); Wenyi Su, Nanjing (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/858,229

(22) Filed: Sep. 18, 2015

Related U.S. Application Data

(60) Provisional application No. 62/091,732, filed on Dec. 15, 2014.

(51) Int. Cl.
*G06T 5/00* (2006.01)
*G06T 5/20* (2006.01)

(52) U.S. Cl.
CPC .......... *G06T 5/002* (2013.01); *G06T 5/20* (2013.01); *G06T 2207/10024* (2013.01); *G06T 2207/20028* (2013.01)

(58) Field of Classification Search
CPC . G06T 5/002; G06T 5/20; G06T 2207/10024; G06T 2207/20028
See application file for complete search history.

(56) References Cited

U.S. PATENT DOCUMENTS

| | | | | |
|---|---|---|---|---|
| 2009/0077359 A1* | 3/2009 | Chakravarthula | .... | G06F 17/153 712/229 |
| 2010/0034480 A1* | 2/2010 | Rao | .......... | G06T 5/20 382/261 |
| 2011/0228096 A1* | 9/2011 | Friel | ......... | H04N 5/33 348/164 |
| 2011/0267348 A1* | 11/2011 | Lin | ......... | G06T 15/205 345/426 |
| 2011/0274350 A1* | 11/2011 | Hara | ......... | G06T 5/20 382/167 |
| 2012/0027319 A1* | 2/2012 | Hu | ......... | H04N 1/409 382/275 |

(Continued)

OTHER PUBLICATIONS

Tomasi et al. ("Bilateral Filtering for Gray and Color Images," IEEE Proceedings of International Conference on Computer Vision, 1998).*

(Continued)

*Primary Examiner* — Yubin Hung

(57) ABSTRACT

System and methods are provided for performing image noise reduction. A pixel having an initial pixel value is selected from an image for performing noise reduction, wherein the image is stored in a data structure in a non-transitory computer-readable storage medium. A block window including a plurality of pixel blocks associated with the selected pixel is determined, wherein a pixel block includes a plurality of pixels. A plurality of pixel block average values for the plurality of pixel blocks are calculated, wherein a pixel block average value corresponds to an average pixel value of a pixel block. A weighted average of the plurality of pixel block average values with respect to the selected pixel is calculated using a bilateral filtering algorithm. The data structure is updated by replacing the initial pixel value of the selected pixel with the weighted average of the plurality of pixel block average values.

17 Claims, 8 Drawing Sheets

(56) References Cited

U.S. PATENT DOCUMENTS

| 2014/0002697 A1* | 1/2014 | Tai | H04N 9/68 |
| | | | 348/242 |
| 2014/0028876 A1* | 1/2014 | Mills | H04N 5/77 |
| | | | 348/231.99 |
| 2015/0071562 A1* | 3/2015 | Yasutomi | G06T 5/002 |
| | | | 382/264 |

OTHER PUBLICATIONS

Liu et al. ("Noise Estimation from a Single Image," IEEE Computer Society Conference on Computer Vision and Pattern Recognition, 2006, pp. 901-908).*

Durand et al. ("Fast Bilateral Filtering for the Display of High-Dynamic-Range Images," Proceedings of ACM SIGGRAPH 2002, vol. 21 Issue 3, Jul. 2002pp. 257-266).*

Paris et al. (A Gentle Introduction to Bilateral Filtering and its Applications, ACM SIGGRAPH 2007, Aug. 5-9, 2007).*

* cited by examiner

SYSTEM AND METHOD FOR REDUCING IMAGE NOISE

CROSS-REFERENCE TO RELATED APPLICATIONS

This disclosure claims priority to and benefit from U.S. Provisional Patent Application No. 62/091,732, filed on Dec. 15, 2014, the entirety of which is incorporated herein by reference.

FIELD

The technology described in this patent document relates generally to image processing and more particularly to noise reduction for image data.

BACKGROUND

Different sources of noise in digital images may be acquired by image sensors in digital cameras, camcorders, and scanners. Noise characteristics in an image may be affected by many factors, such as sensor type, pixel dimensions, temperature, exposure time, etc. Noise often includes fluctuations in color and luminance. Color or "chroma" noise is usually more unnatural in appearance than luminance noise, and can render images unusable if not kept under control. For example, in a red-green-blue (RGB) color space, if the R, G, B components of a pixel (e.g., as a vector) in a Bayer image have a variety of directions, then chroma noise may appear in the image.

Various denoise techniques may be performed to reduce noise in digital images. For example, Gaussian low-pass filtering computes a weighted average of pixel values in a neighborhood, in which the weights decrease with distance from the neighborhood center. The assumption of Gaussian low-pass filtering is that images typically vary slowly over space and nearby pixels are likely to have similar values. It is therefore appropriate to average the pixel values together. Noise values that corrupt the nearby pixels are mutually less correlated than the signal values, so noise can be averaged away while signal values are preserved. However, the assumption of slow spatial variations fails at edges which are consequently blurred by Gaussian low-pass filtering.

Bilateral filtering is a non-linear, edge-preserving noise reduction technique. Bilateral filtering usually implements a domain filter and a range filter to reconstruct every pixel in an image. The domain filter indicates that the closer a neighbor pixel is to a target pixel, the higher the reference value of the neighbor pixel will be. Thus, a domain weight value of a neighbor pixel closer to a target pixel is higher when the target pixel is reconstructed according to each neighbor pixel. The range filter indicates that the more a neighbor pixel is similar (e.g., in terms of intensity, color, etc.) to a target pixel, the higher the reference value of the neighbor pixel will be. Thus, a range weight value of a neighbor pixel more similar to a target pixel is higher when the target pixel is reconstructed according to each neighbor pixel. For example, both the domain filter and the range filter are shift-invariant Gaussian filters. The reconstruction of the target pixel includes replacing the pixel value of the target pixel with a weighted average of pixel values of neighbor pixels. The bilateral filtering can preserve sharp edges by systematically looping through each pixel and adjusting weights to the neighbor pixels accordingly.

SUMMARY

In accordance with the teachings described herein, system and methods are provided for performing image noise reduction. A pixel having an initial pixel value is selected from an image for performing noise reduction, wherein the image is stored in a data structure in a non-transitory computer-readable storage medium. A plurality of pixel blocks associated with the selected pixel are determined, wherein a pixel block includes a plurality of pixels. A plurality of pixel block average values are calculated for the plurality of pixel blocks, wherein a pixel block average value corresponds to an average pixel value of a pixel block. A weighted average of the plurality of pixel block average values with respect to the selected pixel is calculated using a bilateral filtering algorithm. The data structure is updated by replacing the initial pixel value of the selected pixel with the weighted average of the plurality of pixel block average values.

In one embodiment, a device for performing image noise reduction comprises: an input unit configured to select, from an image, a pixel having an initial pixel value for noise reduction, wherein the image is stored in a data structure in a non-transitory computer-readable storage medium; a computation unit configured to determine a plurality of pixel blocks associated with the selected pixel and calculate a plurality of pixel block average values for the plurality of pixel blocks, wherein a pixel block includes a plurality of pixels and a pixel block average value corresponds to an average pixel value of a pixel block; and a filter unit configured to calculate a weighted average of the plurality of pixel block average values with respect to the selected pixel using a bilateral filtering algorithm and update the data structure by replacing the initial pixel value of the selected pixel with the weighted average of the plurality of pixel block average values.

In another embodiment, a system for performing image noise reduction comprises: one or more non-transitory computer-readable storage media configured to store a data structure for an image, and one or more data processors. The one or more data processors are configured to: select, from the image, a pixel having an initial pixel value for performing noise reduction; determine a plurality of pixel blocks associated with the selected pixel, wherein a pixel block includes a plurality of pixels; calculate a plurality of pixel block average values for the plurality of pixel blocks, wherein a pixel block average value corresponds to an average pixel value of a pixel block; calculate a weighted average of the plurality of pixel block average values with respect to the selected pixel using a bilateral filtering algorithm; and update the data structure by replacing the initial pixel value of the selected pixel with the weighted average of the plurality of pixel block average values.

DETAILED DESCRIPTION

As bilateral filtering replaces the pixel value at each pixel in an image by a weighted average of pixel values from nearby pixels, pixel-level noise may be spread out to a neighborhood of pixels in some circumstances. For example, chroma noise may appear as colored blobs in regions of low spatial frequency of an image.

Figure 1:
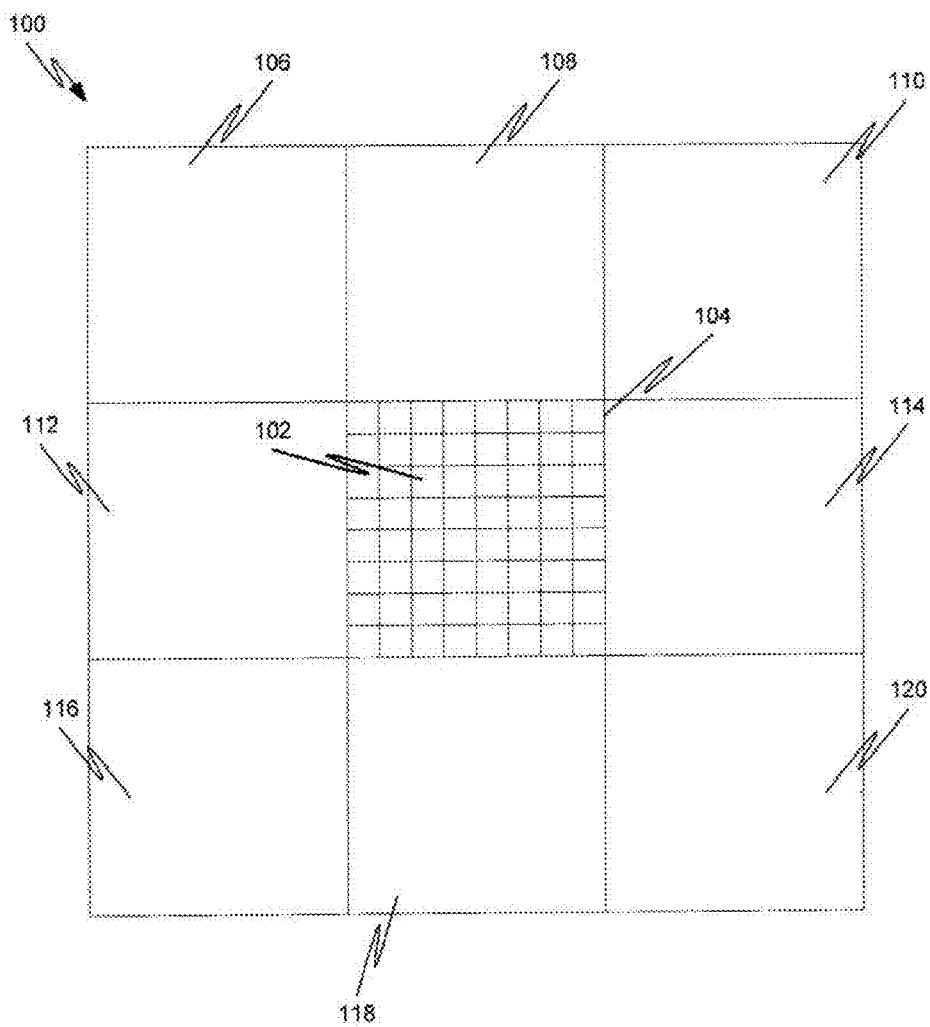
FIG. 1 depicts an example diagram showing pixel-block bilateral filtering for image noise reduction.

FIG. 1 depicts an example diagram showing pixel-block bilateral filtering for image noise reduction. As shown in FIG. 1, a pixel 102 (e.g., a red pixel) is selected for noise reduction processing. A block window 100 that includes a plurality of pixel blocks (e.g., pixel blocks 106, 108, 110, 112, 114, 116, 118 and 120) near the pixel 102 is determined, where the center of the block window 100 is located within a current pixel block 104 which includes the pixel 102. Bilateral filtering is performed between the pixel 102 and pixel block average values of the plurality of pixel blocks within the block window 100 for noise reduction.

Specifically, each pixel block contains multiple rows and multiple columns of pixels. As shown in FIG. 1, each pixel block includes 8×8 pixels. In some embodiments, each pixel block may include 16×16 pixels. It should be understood that the mechanisms described herein are not limited to any pixel block dimensions. The position of the current pixel block 104 which includes the pixel 102 is identified as (X, Y), and the block window 100 that includes the plurality of pixel blocks centers on (X, Y). As shown in FIG. 1, the block window 100 includes 3×3 pixel blocks. In certain embodiments, the block window 100 may include 5×5 pixel blocks. It should be understood that the mechanisms described herein are limited to any block window dimensions or any block window symmetry. In some embodiments, the block window 100 may include 7×5 pixel blocks, and the block 104 is at the 4$^{th}$ row and the 4$^{th}$ column.

Bilateral filtering can be performed between the pixel 102 and pixel block average values of the plurality of pixel blocks within the block window. For example, the pixel block average values are weighted based on spatial distances of the pixel blocks from the pixel 102 (e.g., domain filtering). In addition, the pixel block average values are weighted based on tonal differences (e.g., intensity, color, etc.) of the pixel blocks from the pixel 102 (e.g., range filtering). In some embodiments, bilateral filtering can be performed in a linear RGB color space. Similar range filter weighting is applied to the R, G, B components of the pixel 102 (e.g., as a vector). Specifically, the range filter weighting is performed based on similarity and noise models. For example, similarity of Gaussian probability distributions for the R, G, B components can be determined as follows:

$$p_r = e^{-\frac{(R-R_{block\_avg})*(R-R_{block\_avg})}{2*\sigma_R*\sigma_R}} \quad (1)$$

$$p_g = e^{-\frac{(G-G_{block\_avg})*(G-G_{block\_avg})}{2*\sigma_G*\sigma_G}} \quad (2)$$

$$p_b = e^{-\frac{(B-B_{block\_avg})*(B-B_{block\_avg})}{2*\sigma_B*\sigma_B}} \quad (3)$$

where $p_r$, $p_g$, and $p_b$ represent similarity of Gaussian probability distributions for the R, G, B components of the pixel 102, respectively. In addition, $R_{block\_avg}$, $G_{block\_avg}$, and $B_{block\_avg}$ represent pixel block average values for the R, G, B components of each pixel block, respectively. Further, $\sigma_R$, $\sigma_G$, and $\sigma_B$ represent standard deviations of noise for the R, G, B components of the pixel 102, respectively.

A total similarity is determined as follows:

$$p_{tot} = p_r * p_g * p_b \quad (4)$$

A look-up table (LUT) of a certain precision can be used to calculate exponents in the equations (1)-(3) (e.g., to improve the calculation speed). In addition, as the pixel 102 can take certain discrete pixel values, corresponding standard deviations of noise can take certain discrete values. Thus, noise models may be achieved by using one or more LUTs for standard deviations of noise associated with certain pixel values.

The pixel value of the pixel 102 may be replaced with a weighted average of the pixel block average values within the block window, and the weighted average is determined as follows:

$$P_{rep} = \frac{\sum_{j=1}^{N} P_j * p_{tot\_j} * w_{domain\_j}}{\sum_{j=1}^{N} p_{tot\_j} * w_{domin\_j}} \quad (5)$$

where $P_{rep}$ represents the weighted average of the pixel block average values within the block window, $P_j$ represents a pixel block average value of a neighbor pixel block j, $p_{tot\_j}$ represents a total similarity between the pixel 102 and the pixel block average value of the neighbor pixel block j, and N represents the number of the neighbor pixel blocks. In addition, $w_{domain\_j}$ represents a domain weight which is related to the spatial distance between the neighbor pixel block j and the pixel 102.

As described above, the pixel 102 is filtered as a vector, and similar range filter weighting is applied to the R, G, B components of the pixel 102. For example, the initial R, G, B components of the pixel 102 may be of different directions. After the above-noted pixel-block bilateral filtering, the R, G, B components of the pixel 102 are aligned approximately to a same direction, and thus the chroma noise associated with the pixel 102 is reduced.

In certain embodiments, bilateral filtering can be performed in a color space other than the linear RGB space, such as a YUV color space which is defined in terms of one luma (Y') and two chrominance (UV) components. The above-noted pixel-block bilateral filtering can be modified to be performed in the YUV color space for noise reduction.

Figure 2:
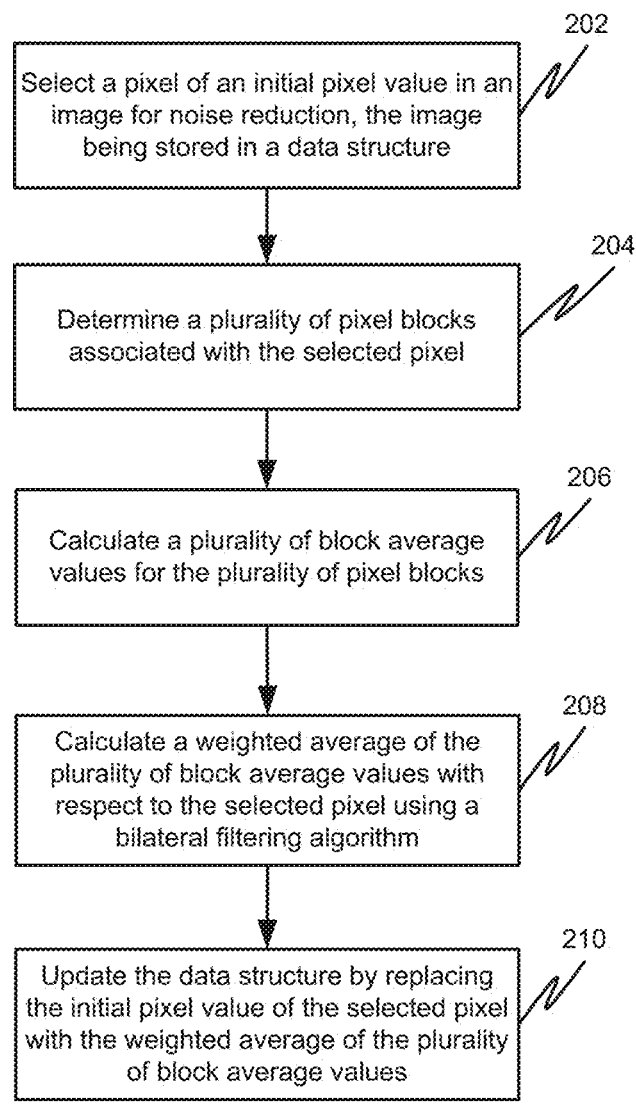
FIG. 2 depicts an example flow chart for performing pixel-block bilateral filtering to reduce image noise.

FIG. 2 depicts an example flow chart for performing pixel-block bilateral filtering to reduce image noise. The operations of the flow chart illustrated in FIG. 2 can be performed by a computing system according to one embodiment. The operations of the flow chart illustrated in FIG. 2 can be implemented in software, firmware, hardware, or any combination thereof. At 202, a computing system (e.g., an image noise reduction module of the computing system) selects, from an image, a pixel having an initial pixel value for performing noise reduction. For example, the computing system may select the pixel 102 from the image illustrated in FIG. 1. In one embodiment, the image is stored in a data structure in a non-transitory computer-readable storage medium. At 204, the computing system determines a plurality of pixel blocks associated with the selected pixel, where each pixel block includes a plurality of pixels. For example, the computing system determines the plurality of pixel blocks (e.g., the pixel blocks 106, 108, 110, 112, 114, 16, 118 and 120) near the pixel 102, as shown in FIG. 1.

At 206, the computing system calculates a plurality of pixel block average values for the plurality of pixel blocks, where each pixel block average value corresponds to an average pixel value of a pixel block. For example, the pixel block average value of each pixel block within the block window 100 in FIG. 1 corresponds to an average pixel value of all pixels within the pixel block. At 208, the computing system calculates a weighted average of the plurality of pixel block average values with respect to the selected pixel using a bilateral filtering algorithm. For example, the pixel block average values are weighted based on spatial distances of the pixel blocks from the pixel 102 as shown in FIG. 1. In addition, the pixel block average values are weighted based on tonal differences (e.g., intensity, color, etc.) of the pixel blocks from the pixel 102 (e.g., range filtering). As an example, the computing system calculates the weighted average of the plurality of pixel block average values according to Equation (5). At 210, the computing system updates the data structure by replacing the initial pixel value of the selected pixel with the weighted average of the plurality of pixel block average values.

The calculation complexity of the above-noted pixel-block bilateral filtering shall now be described. For example, a pixel block includes B*B pixels, where B is an integer. A block window has a size of W*H, where W represents the number of columns of pixel blocks within the block window and H represents the number of rows of pixel blocks within the block window. Each pixel has a bit depth of D, where D is an integer.

In some embodiments, as shown in the equations (1)-(3), each similarity parameter may need noise model LUTs and Gaussian probability distribution LUTs of three channels (e.g., the R, G, B channels). The total similarity as shown in the equation (4) may need three multiplication operations. Each weighting average calculation includes two addition operations and one multiplication operation. Therefore, the total number of operations includes W*H*2 addition operations, W*H*4 multiplication operations, W*H*6 LUT operations, and one division operation. For example, if a 3×3 block window is determined for noise reduction of a pixel, 108 operations may be performed for that particular pixel. A 5×5 block window corresponds to 300 operations for each pixel.

The calculation complexity in the memory with a line buffer zone shall now be described. The line buffer zone (e.g., converted to a single channel and having a same amount of bit depth) includes S lines of pixel block average values, where each pixel block average value includes the R, G and B values, a total of 3*H/B. One-line accumulators are provided for calculating a next line block average, where each accumulator may need additional eight bits for comparison with normal pixel values, a total of 3*(D+8)/B. In addition, before all the pixel block average values are to be calculated, pixels may cache at least ROUNDUP (H/2)*B delay lines. For example, if B=8, H=5, D=12, then the delay lines are 2.5 lines+24 lines. In another example, if B=16, H=5, D=12, then the delay lines are 1.25 lines+48 lines.

Figure 3:
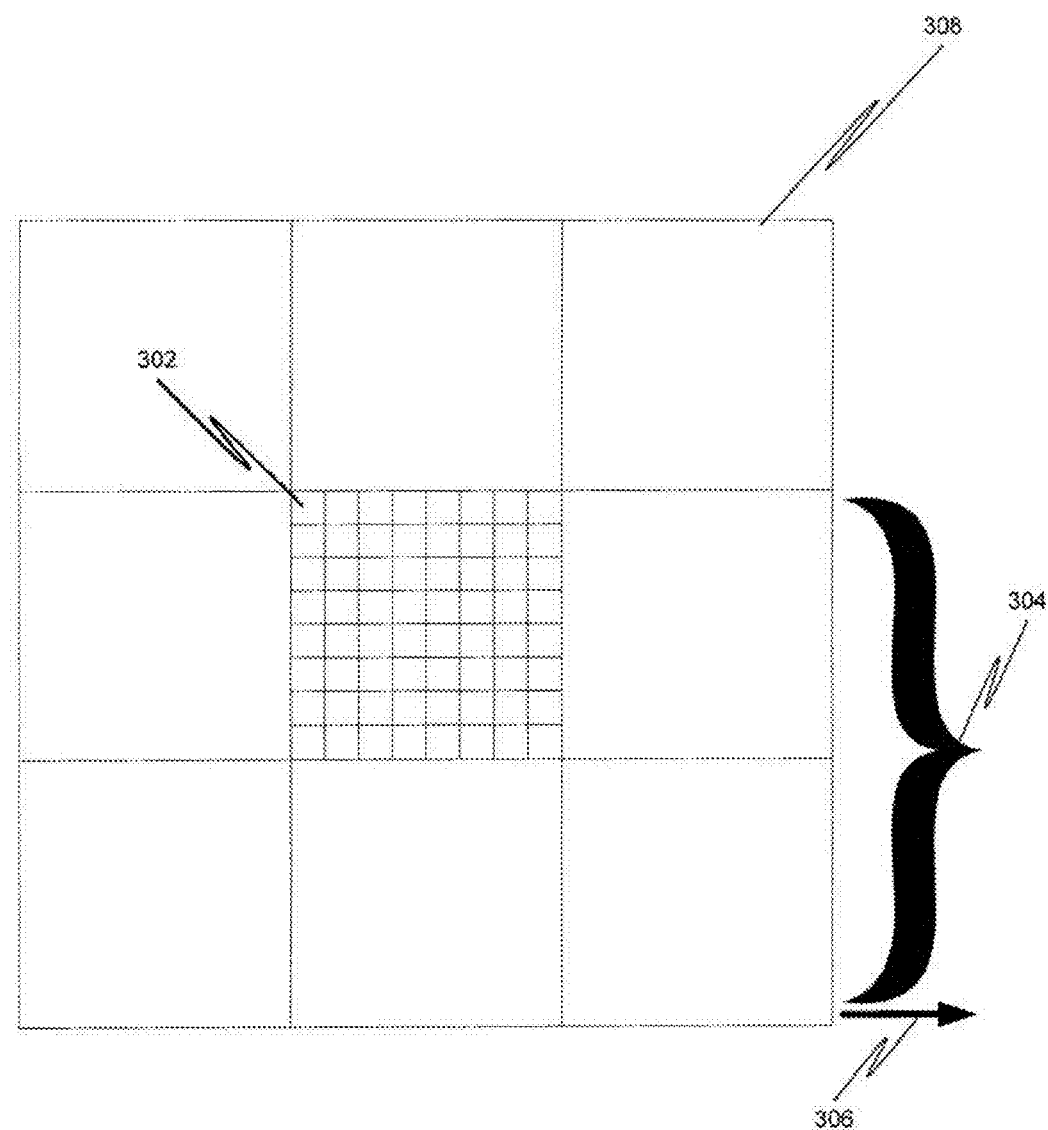
FIG. 3 depicts an example diagram showing delay lines during a pixel-block bilateral filtering process.

FIG. 3 depicts an example diagram showing delay lines during a pixel-block bilateral filtering process. As shown in FIG. 3, a pixel 302 is selected for noise reduction. Calculation of one or more pixel block average values is performed. The buffering of a number of pixel lines (e.g., 16 lines) is performed before the pixel-block bilateral filtering. For example, the pixel lines 306 labeled by the parenthesis in FIG. 3 (e.g., 16 lines) are buffered before bilateral filtering is performed for the pixel 302. The pixel block average values of a 3×3 block window 308 are ready after the pixel line 306 is buffered, as shown by an arrow in FIG. 3.

Figure 4:
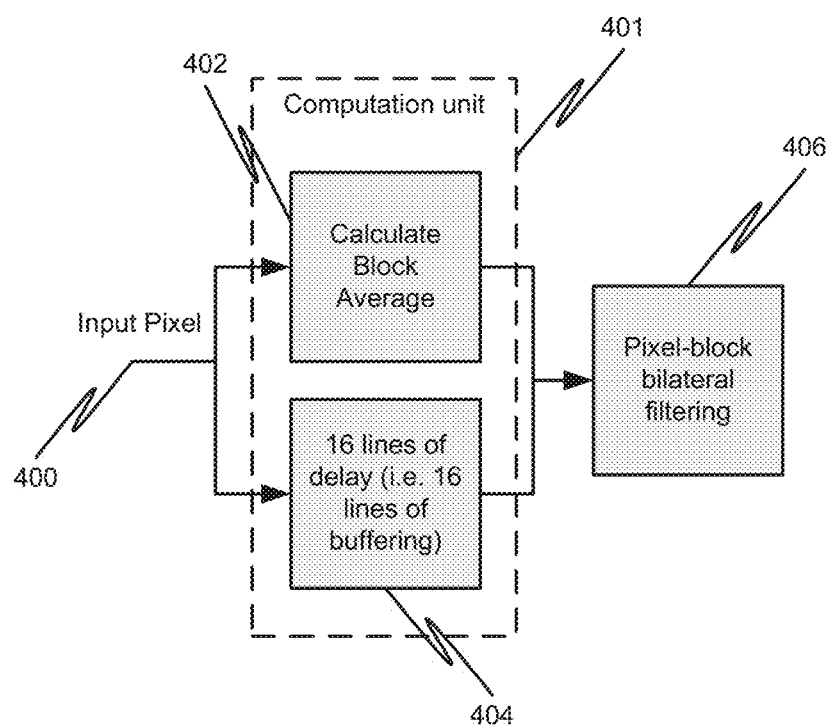
FIG. 4 depicts an example diagram showing certain components of a device for image noise reduction.

FIG. 4 depicts an example diagram showing certain components of a device for image noise reduction. As shown in FIG. 4, an input pixel 400 is processed by a computation unit 401, and a filter unit 406 performs pixel-block lateral filtering on the output of the computation unit 401 to reduce image noise.

Specifically, in the computation unit 401, a block-average calculator 402 determines a current pixel block that includes the input pixel 400, and determines a block window that includes a plurality of neighbor pixel blocks which surround the current pixel block. For example, the block window centers on the current pixel block. Further, the block-average calculator 402 calculates the pixel block average values for the neighbor pixel blocks. A buffer unit 404 processes the input pixel 400 and buffers a certain number of pixel lines of the determined block window (e.g., 16 pixel lines). Then, the filter unit 406 calculates a weighted average of the pixel block average values for the neighbor pixel blocks to replace the pixel value of the input pixel 400.

Figure 5:
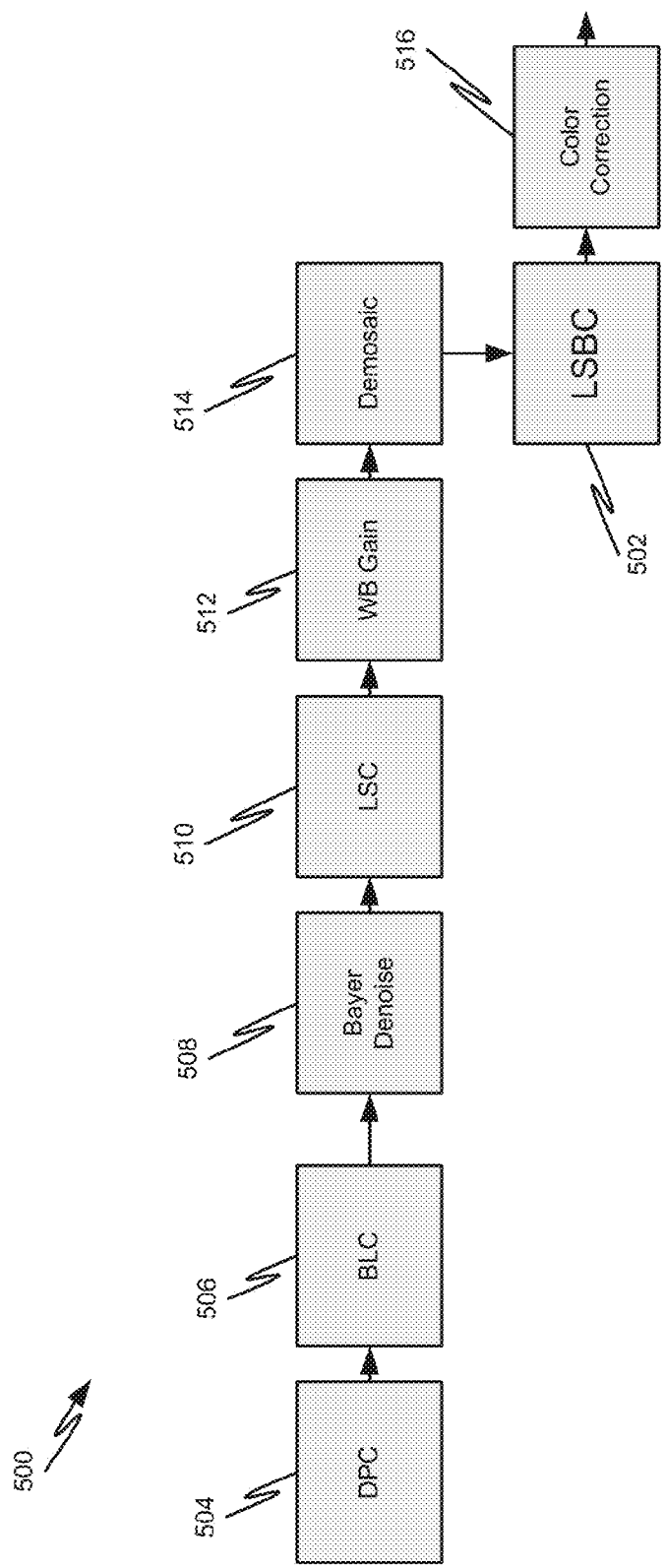
FIG. 5 depicts an example diagram showing certain components of an image processing pipeline.

FIG. 5 depicts an example diagram showing certain components of an image processing pipeline. As shown in FIG. 5, a Large Scale Bilateral Filter for Chroma Noise Removal (LSBC) unit 502 includes one or more line buffer zones for buffering a certain number of pixel lines before the LSBC unit 502 calculates a weighted average of pixel block average values of neighbor pixel blocks of a selected pixel of an input image.

Specifically, the input image is processed in a pipeline 500 that includes a defective pixel correction (DPC) unit 504, a black level correction (BLC) unit 506, a Bayer denoise unit 508, a lens shading correction (LSC) unit 510, a white-balance gain (WB) unit 512, a demosaic unit 514, the LSBC unit 502, and a color correction unit 516. The Bayer denoise unit 508 and the demosaic unit 514 each need one or more line buffer zones for buffering pixel lines. Compared with other units in the pipeline 500, the LSBC unit 502, the Bayer denoise unit 508 and the demosaic unit 514 may cause long signal delays.

Figure 6:
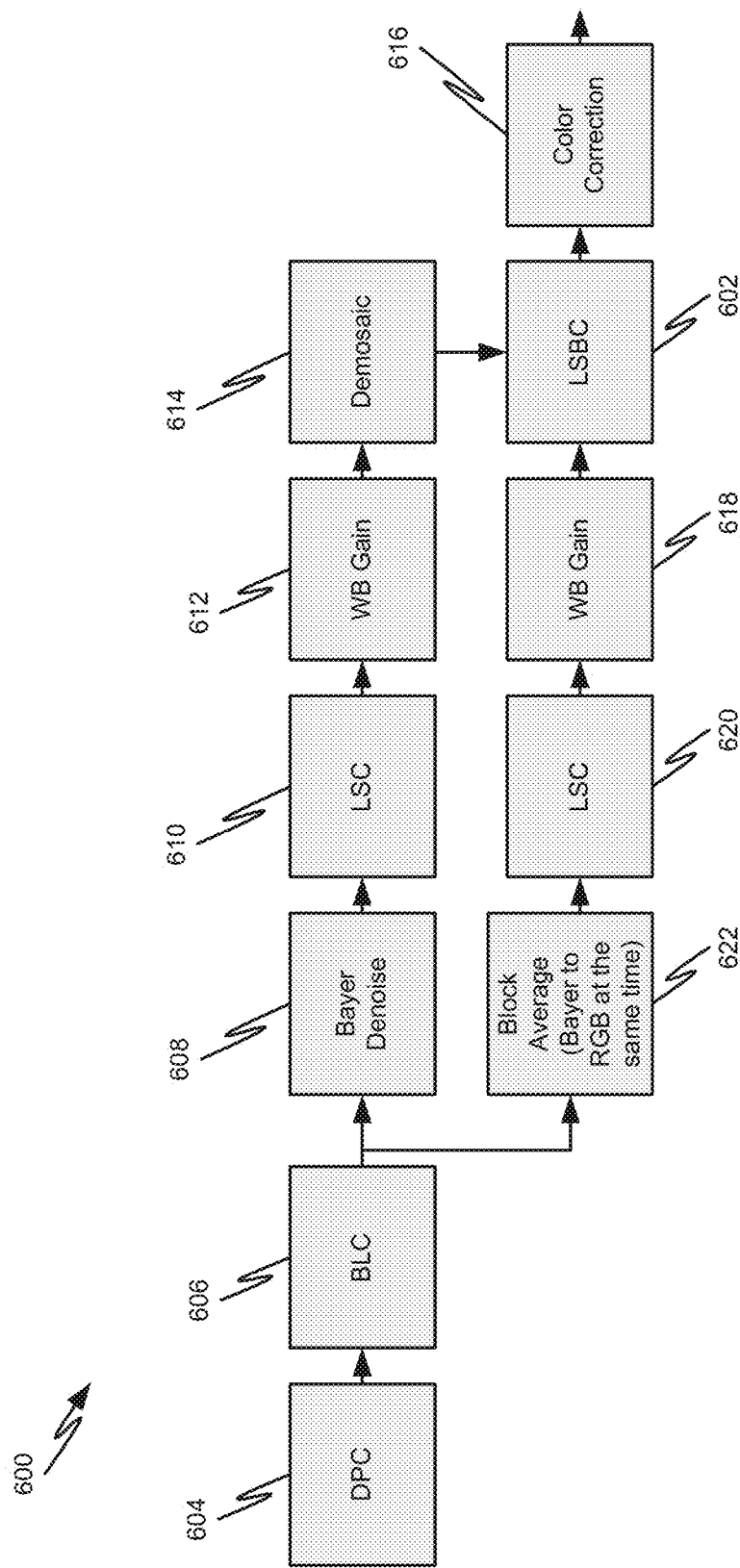
FIG. 6 depicts another example diagram showing certain components of an image processing pipeline.

To further improve the efficiency of the image processing pipeline 500 as shown in FIG. 5, additional software/hardware units may be added. FIG. 6 depicts another example diagram showing certain components of an image processing pipeline. As shown in FIG. 6, a block-average calculation unit 622 includes one or more line buffer zones for buffering a certain number of pixel lines for calculating pixel block average values of neighbor pixel blocks of a selected pixel of an input image.

Specifically, the input image is processed in a pipeline 600 including a DPC unit 604 and a BLC unit 606. Then, the output of the BLC unit 606 is processed by two branches of the pipeline 600 in parallel. One branch includes a Bayer denoise unit 608, a first LSC unit 610, a first WB unit 612, and a demosaic unit 614. The output of the demosaic unit 614 is provided to a LSBC unit 602. The other branch includes the block-average calculation unit 622, a second LSC unit 620, and a second WB unit 618. The output of the second WB unit 618 is provided to the LSBC unit 602. The LSBC unit 602 calculates a weighted average of the pixel block average values of the neighbor pixel blocks of the selected pixel, and a color correction unit 616 processes the output of the LSBC unit 602.

The Bayer denoise unit 608, the demosaic unit 614, and the block-average calculation unit 622 may each cause long signal delays, compared with other units in the pipeline 600. But as the Bayer denoise unit 608 and the demosaic unit 614 are located on one branch of the pipeline 600 while the block-average calculation unit 622 is located on the other branch, the delays caused by these units may offset each other (e.g., particularly if the number of line buffers included in the Bayer denoise unit 608 and the demosaic unit 614 is larger than or equal to that of the block-average calculation unit 622). Therefore, the LSBC unit 602 does not need to include any line buffer zones for buffering pixel lines, and the overall signal delay along the pipeline 600 can be reduced.

Furthermore, the architecture of the image processing pipeline may reduce the size of the line buffer memory (e.g., used in the LSBC unit 602) and thus save die areas. For example, for an instruction-set processor that supports up to 16 M pixels and 10-bit pixels for internal calculation, each line of buffer is implemented as a 46 Kbits static random access memory (SRAM), and thus, a plurality of delay lines may require a large line buffer memory. As an example, 16 delay lines may require 0.7 Mbits SRAM, and 48 delay lines may require 2.2 Mbits SRAM. As described above, the LSBC unit 602 as shown in FIG. 6 does not need to include any line buffer zones for buffering pixel lines, which may result in significant savings of silicon die areas.

It should be understood that the mechanisms described herein are not limited to application-specific integrated circuits (ASIC). According to some embodiments, a hardware image-signal-processor (ISP) pipeline can be implemented for performing the mechanisms described herein. For example, the ISP pipeline includes a series of image processing modules which are synchronized with an ISP clock.

Figure 7:
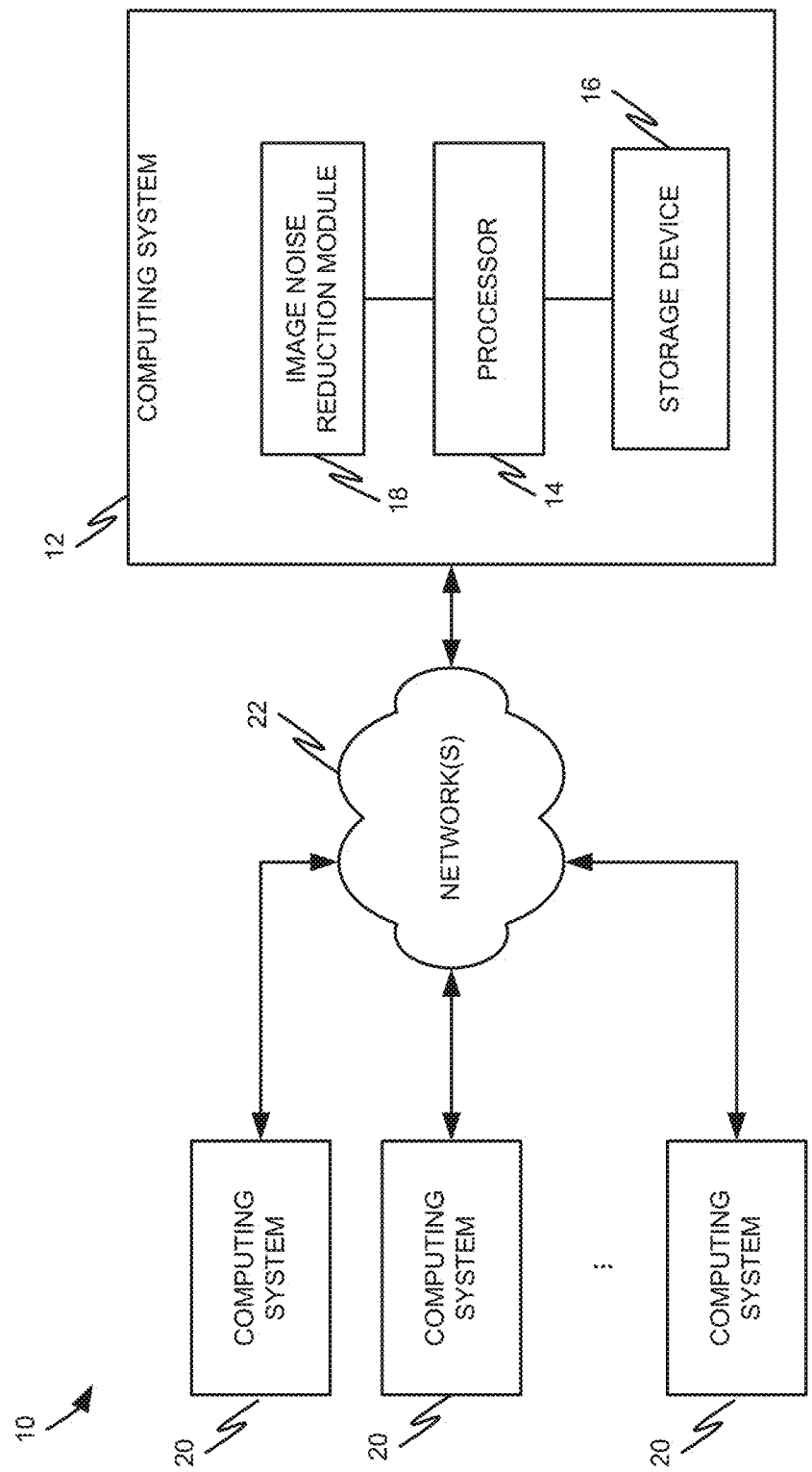
FIG. 7 depicts an example diagram showing a system for image noise reduction.

FIG. 7 depicts an example diagram showing a system for image noise reduction. As shown in FIG. 7, the system 10 includes a computing system 12 which contains a processor 14, a storage device 16 and an image noise reduction module 18. The computing system 12 includes any suitable type of computing device (e.g., a server, a desktop, a laptop, a tablet, a mobile phone, etc.) that includes the processor 14 or provide access to a processor via a network 22 or as part of a cloud based application. The image noise reduction module 18 performs tasks (e.g., the operations of the method shown in FIG. 2) and is implemented as part of a user interface module (not shown in FIG. 7). The image noise reduction module 18 can be implemented in software, firmware, hardware, or any combination thereof.

Figure 8:
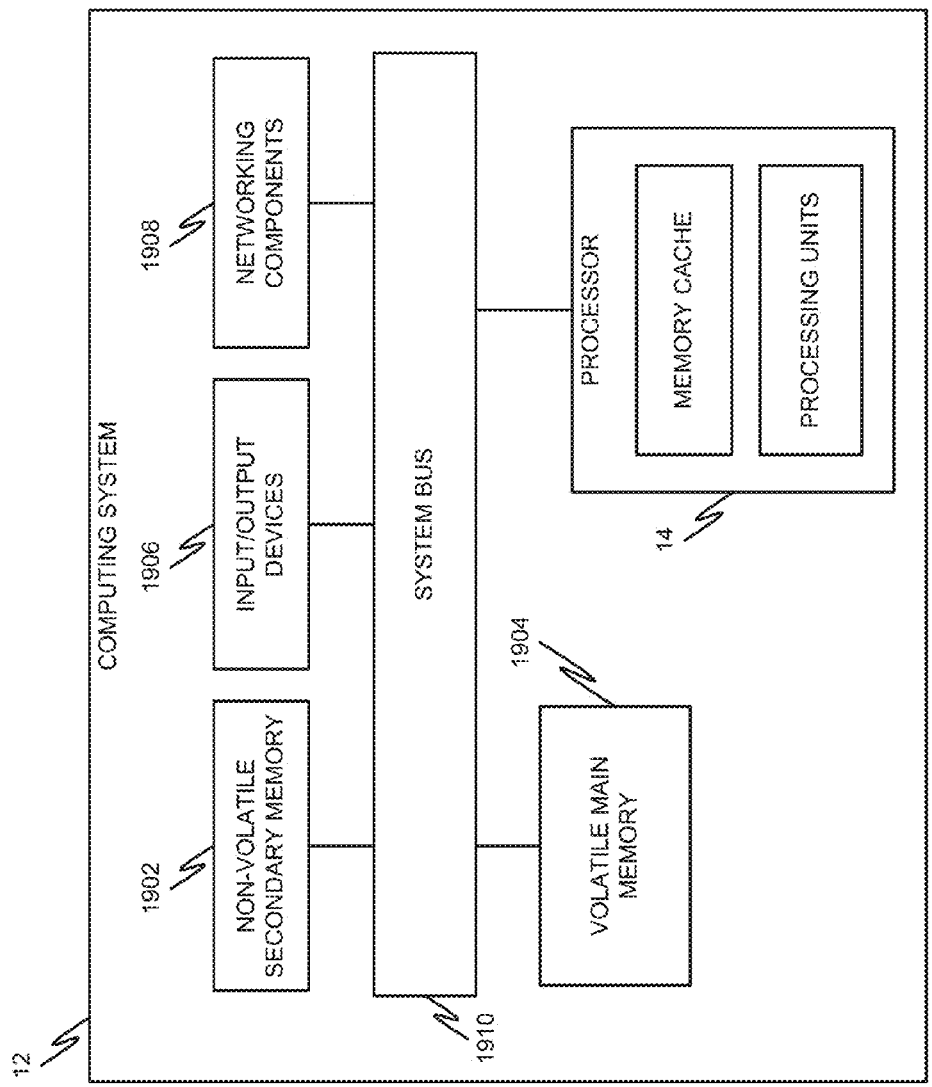
FIG. 8 depicts an example diagram showing a computing system for image noise reduction.

FIG. 8 depicts an example diagram showing a computing system for image noise reduction. As shown in FIG. 8, the computing system 12 includes a processor 14, memory devices 1902 and 1904, one or more input/output devices 1906, one or more networking components 1908, and a system bus 1910. In some embodiments, the computing system 12 includes the image noise reduction module 18, and provides access to the image noise reduction module 18 to a user as a stand-alone computer.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A method for performing image noise reduction, the method comprising:
   selecting, from an input image, a pixel having an initial pixel value, for performing noise reduction, wherein the input image is stored in a data structure in a non-transitory computer-readable storage medium;
   determining a plurality of pixel blocks associated with the selected pixel, wherein a pixel block includes a plurality of pixels;
   calculating a plurality of pixel block average values for the plurality of pixel blocks, wherein a pixel block average value corresponds to an average pixel value of a pixel block;
   calculating a weighted average of the plurality of pixel block average values with respect to the selected pixel using a bilateral filtering algorithm, by
      determining one or more similarity parameters for a pixel block based at least in part on a pixel block average value of the pixel block and the initial pixel value of the selected pixel,
      determining one or more weight parameters for the pixel block based at least in part on the one or more similarity parameters,
      calculating a total similarity for the pixel block based at least in part on the one or more similarity parameters, and
      calculating the weighted average of the plurality of pixel block average values based at least in part on the total similarity for the pixel block; and
   updating the data structure by replacing the initial pixel value of the selected pixel with the weighted average of the plurality of pixel block average values.

2. The method of claim 1, wherein determining the plurality of pixel blocks associated with the selected pixel includes:
   determining a current pixel block that includes the selected pixel; and
   determining the plurality of pixel blocks surrounding the current pixel block.

3. The method of claim 1, wherein a pixel block average value is equal to an average of pixel values of all pixels in a pixel block.

4. The method of claim 1, wherein the one or more similarity parameters are determined based at least in part on Gaussian probability distributions associated with the initial pixel value.

5. The method of claim 1, wherein:
   the initial pixel value includes a R component, a G component and a B component in a red-green-blue color space; and the one or more similarity parameters are determined by:

$$p_r = e^{-\frac{(R-R_{block\_avg})*(R-R_{block\_avg})}{2*\sigma_R*\sigma_R}}$$

$$p_g = e^{-\frac{(G-G_{block\_avg})*(G-G_{block\_avg})}{2*\sigma_G*\sigma_G}}$$

$$p_b = e^{-\frac{(B-B_{block\_avg})*(B-B_{block\_avg})}{2*\sigma_B*\sigma_B}}$$

where $p_r$, $p_g$, and $p_b$ represent the one or more similarity parameters for the R, G, B components of the initial pixel value, respectively, wherein $R_{block\_avg}$, $G_{block\_avg}$, and $B_{block\_avg}$ represent average values for R, G, B components of the pixel block, respectively, and wherein $\sigma_R$, $\sigma_G$, and $\sigma_B$ represent standard deviations of noise for the R, G, B components of the initial pixel value, respectively.

6. The method of claim 5, wherein:
the standard deviations of noise for the R, G, B components of the initial pixel value are determined using a first look-up table; and
the one or more similarity parameters for the R, G, B components of the initial pixel value are determined using a second look-up table.

7. The method of claim 1, wherein the steps of the method are performed by one or more data processors.

8. The method of claim 1, wherein the steps of the method are performed by an application specific integrated circuit.

9. A device for performing image noise reduction, the device comprising:
input circuitry configured to select, from an input image, a pixel having an initial pixel value for performing noise reduction, wherein the input image is stored in a data structure in a non-transitory computer-readable storage medium;
computation circuitry configured to determine a plurality of pixel blocks associated with the selected pixel and calculate a plurality of pixel block average values for the plurality of pixel blocks, wherein a pixel block includes a plurality of pixels and a pixel block average value corresponds to an average pixel value of a pixel block; and
filter circuitry configured to
calculate a weighted average of the plurality of pixel block average values with respect to the selected pixel using a bilateral filtering algorithm, by
determining one or more similarity parameters for a pixel block based at least in part on a pixel block average value of the pixel block and the initial pixel value of the selected pixel, and
determining one or more weight parameters for the pixel block based at least in part on the one or more similarity parameters,
calculating a total similarity for the pixel block based at least in part on the one or more similarity parameters; and
calculating the weighted average of the plurality of pixel block average values based at least in part on the total similarity for the pixel block; and
update the data structure by replacing the initial pixel value of the selected pixel with the weighted average of the plurality of pixel block average values.

10. The device of claim 9, further comprising:
first lens shading correction circuitry configured to perform lens shading correction for the output of the computation circuitry; and
first white-balance gain unit circuitry configured to perform white-balancing operations for the output of the first lens shading correction circuitry;
wherein:
the computation circuitry is further configured to receive said plurality of pixel blocks from the input image; and
the filter circuitry is further configured to calculate the weighted average of the plurality of pixel block average values with respect to the selected pixel based at least in part on the output of the first white-balance gain circuitry.

11. The device of claim 9, wherein the computation circuitry is further configured to determine a current pixel block that includes the selected pixel and determine the plurality of pixel blocks surrounding the current pixel block.

12. The device of claim 9, wherein:
the initial pixel value includes a R component, a G component and a B component in a red-green-blue color space; and
the filter circuitry is further configured to determine the one or more similarity parameters by:

$$p_r = e^{-\frac{(R-R_{block\_avg})*(R-R_{block\_avg})}{2*\sigma_R*\sigma_R}}$$

$$p_g = e^{-\frac{(G-G_{block\_avg})*(G-G_{block\_avg})}{2*\sigma_G*\sigma_G}}$$

$$p_b = e^{-\frac{(B-B_{block\_avg})*(B-B_{block\_avg})}{2*\sigma_B*\sigma_B}}$$

where $p_r$, $p_g$, and $p_b$ represent the one or more similarity parameters for the R, G, B components of the initial pixel value, respectively, wherein $R_{block\_avg}$, $G_{block\_avg}$, and $B_{block\_avg}$ represent average values for R, G, B components of the pixel block, respectively, and wherein $\sigma_R$, $\sigma_G$, and $\sigma_B$ represent standard deviations of noise for the R, G, B components of the initial pixel value, respectively.

13. A system for performing image noise reduction comprising:
one or more non-transitory computer-readable storage media configured to store a data structure for an input image; and
one or more data processors configured to:
select, from the input image, a pixel having an initial pixel value for performing noise reduction;
determine a plurality of pixel blocks associated with the selected pixel, wherein a pixel block includes a plurality of pixels;
calculate a plurality of pixel block average values for the plurality of pixel blocks, wherein a pixel block average value corresponds to an average pixel value of a pixel block;

calculate a weighted average of the plurality of pixel block average values with respect to the selected pixel using a bilateral filtering algorithm, by
determining one or more similarity parameters for a pixel block based at least in part on a pixel block average value of the pixel block and the initial pixel value of the selected pixel, and
determining one or more weight parameters for the pixel block based at least in part on the one or more similarity parameters,
calculating a total similarity for the pixel block based at least in part on the one or more similarity parameters; and
calculating the weighted average of the plurality of pixel block average values based at least in part on the total similarity for the pixel block; and
update the data structure by replacing the initial pixel value of the selected pixel with the weighted average of the plurality of pixel block average values.

14. A method for performing image noise reduction, the method comprising:
receiving an input image:
selecting, from the input image, a pixel having an initial pixel value, for performing noise reduction, wherein the input image is stored in a data structure in a non-transitory computer-readable storage medium;
determining a plurality of pixel blocks associated with the selected pixel, wherein a pixel block includes a plurality of pixels;
calculating a plurality of pixel block average values for the plurality of pixel blocks, wherein a pixel block average value corresponds to an average pixel value of a pixel block;
calculating a weighted average of the plurality of pixel block average values with respect to the selected pixel, based at least in part on output of the first white-balance gain operation, using a bilateral filtering algorithm;
updating the data structure by replacing the initial pixel value of the selected pixel with the weighted average of the plurality of pixel block average values;
performing a first lens shading correction for output of the pixel block average values;
performing first white-balancing operations for output of the first lens shading correction;
reducing mosaic effects for output of the first white-balance gain operation;
performing Bayer denoise operations for the input image;
performing second lens shading correction for output of the Bayer denoise operations;
performing second white-balancing operations for the output of the second lens shading; and
calculating the weighted average of the plurality of pixel block average values with respect to the selected pixel based at least in part on the output of the first white-balance gain operation and output of the operation of reducing of demosaic effects.

15. A device for performing image noise reduction, the device comprising:
input circuitry configured to select, from an input image, a pixel having an initial pixel value for performing noise reduction, wherein the input image is stored in a data structure in a non-transitory computer-readable storage medium;
computation circuitry configured to determine a plurality of pixel blocks associated with the selected pixel and calculate a plurality of pixel block average values for the plurality of pixel blocks, wherein a pixel block includes a plurality of pixels and a pixel block average value corresponds to an average pixel value of a pixel block; and
filter circuitry configured to calculate a weighted average of the plurality of pixel block average values with respect to the selected pixel using a bilateral filtering algorithm and update the data structure by replacing the initial pixel value of the selected pixel with the weighted average of the plurality of pixel block average values;
first lens shading correction circuitry configured to perform lens shading correction for the output of the computation circuitry; and
first white-balance gain unit circuitry configured to perform white-balancing operations for the output of the first lens shading correction circuitry, wherein the computation circuitry is further configured to receive said plurality of pixel blocks from the input image, and the filter circuitry is further configured to calculate the weighted average of the plurality of pixel block average values with respect to the selected pixel based at least in part on the output of the first white-balance gain circuitry;
demosaic circuitry configured to reduce mosaic effects for the output of the first white-balance gain circuitry;
denoise circuitry configured to perform Bayer denoise operations for the input image;
second lens shading correction circuitry configured to perform lens shading correction for the output of the denoise circuitry;
second white-balance gain circuitry configured to perform white-balancing operations for the output of the second lens shading correction circuitry;
wherein the filter circuitry is further configured to calculate the weighted average of the plurality of pixel block average values with respect to the selected pixel based at least in part on the output of the first white-balance gain circuitry and the output of the demosaic circuitry.

16. The device of claim 15, wherein:
the denoise circuitry and the demosaic circuitry are further configured to buffer a first number of pixel lines; and
the computation circuitry is further configured to buffer a second number of pixel lines; and
the first number of pixel lines are more than or equal to the second number of pixel lines.

17. The device of claim 16, wherein the filter circuitry is further configured not to buffer any pixel lines in response to the first number of pixel lines being more than or equal to the second number of pixel lines.

* * * * *